Feb. 6, 1940. K. RÄNTSCH ET AL 2,189,297
DIAPHRAGM FOR PREVENTING DOMINANTS ON COLORED PICTURES
Filed Feb. 23, 1937
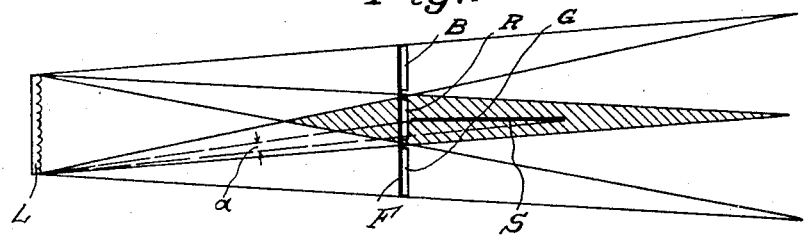
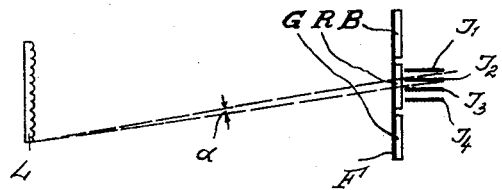
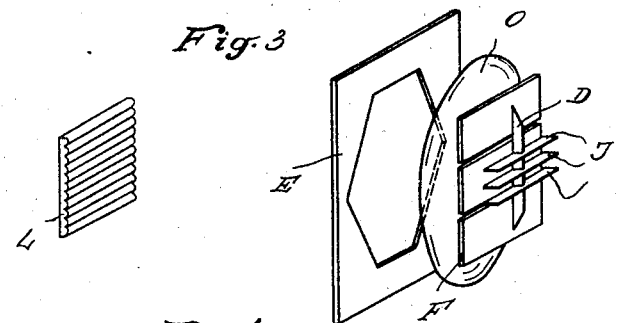
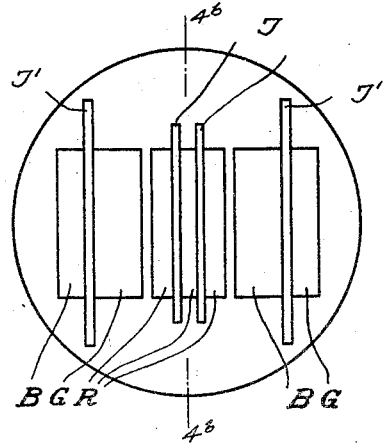
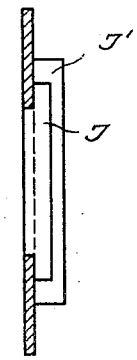

Patented Feb. 6, 1940

2,189,297

UNITED STATES PATENT OFFICE 2,189,297

DIAPHRAGM FOR PREVENTING DOMINANTS ON COLORED PICTURES

Kurt Räntsch, Berlin-Steglitz, and Heinz Retzlaff, Schonow, near Bernau, Germany, assignors to Opticolor Aktiengesellschaft, Glarus, Switzerland, a corporation of Switzerland Application February 23, 1937, Serial No. 127,275
In Germany February 28, 1936

3 Claims. (Cl. 95—2)

Our invention relates to diaphragms for preventing dominants on colored pictures.

Diaphragms for avoiding dominants when taking pictures on lenticulated films and/or projecting the same are well known and are placed in the path of rays in spaced relation to the colored filter. By the use of such diaphragms it is possible to avoid color falsifications within the picture field which, for instance, are caused by undesired vignetting in the path of the rays to such an extent as not to give rise to any trouble. To this end, it is necessary that in projecting a homogeneous colored or white surface the partial intensities of illumination caused by the three filter bands have a constant ratio which is the same for all picture elements. This may be attained by additional diaphragms which compensate for the vignetting of the objective.

By the diaphragms hitherto known it was only possible when using the usual form of filter to influence the colors of a lateral band predominating in the picture.

Our invention has for its object the provision of a diaphragm, in spaced relation to the color filter, whereby also a slight color falsification of the picture may be eliminated caused by the inner bands of the filter.

In the accompanying drawing, in which are shown selected embodiments of the invention, Fig. 1 is a longitudinal diagrammatic view through part of an apparatus for practicing the invention;

Fig. 2 is a fragmentary view similar to Fig. 1 but showing a different embodiment of the invention;

Fig. 3 is a perspective view of another form of apparatus;

Fig. 4a is a face view of another form of diaphragm than shown in the preceding figures;

Fig. 4b is a vertical sectional view through the diaphragm shown in Fig. 4a, being taken approximately on the line 4b—4b of Fig. 4a.

In Fig. 1, L represents a lenticulated film and F the color filter provided with the bands B, R and G used for taking or reproducing pictures. The range within which only light of the color of the central zone is available is in this case indicated by the cross-hatched surface. It is not possible to approach this range with a dominant diaphragm without influencing also the lateral beams of light belonging to the other colors.

According to the invention the diaphragm in spaced relation to the color filter is not arranged perpendicularly to the axis of the objective but substantially parallel thereto. Such a diaphragm S is shown in Fig. 1.

The diaphragm which is arranged approximately in the middle of the central zone permits the incident beam parallel to the exis to pass through the filter without being influenced, whereas the light falling on the edges of the picture field is partly cut off by the diaphragm S. As plainly seen in Fig. 1, the diaphragm has one edge closely adjacent the filter, whereas the one diaphragm itself extends away from the filter at approximately right angles thereto or, as previously stated, substantially parallel to the axis of the objective used in exposing the film. This edge of the diaphragm also is substantially parallel to the lines dividing the zones and which are usually in the form of opaque partitions of some kind. The range removed from the beam of light is indicated in Fig. 1 by the angle $\alpha$. A color of the central zone predominating on the edges of the picture may be eliminated by such a dominant diaphragm without influencing in any way the reproduction of the lateral filter bands.

The dominants caused by the vignetting of the objective in the picture surfaces of the lateral filter bands may be eliminated by known diaphragms. However, it is also possible to use also for the lateral bands diaphragms arranged perpendicularly to the filter so as to avoid the occurrence of dominants of each color.

The color filter used when taking pictures on lenticulated films is in the majority of cases arranged so close to an objective or also to an optical system or in an objective that it is not possible to give the diaphragm according to the invention such a size as to completely avoid the occurrence of dominants. In such an arrangement it is, therefore, possible according to the invention, to shorten the dominant diaphragm S and to split it up into various parts arranged preferably perpendicular to one another as shown in Fig. 2 by $I_1, I_2, I_3 \ldots$. The diaphragms are, therefore, arranged with respect to the color filter in a manner similar to the flaps of an open blind. Also in this case, the light directed parallel to the axis passes without being intercepted, whereas the intensity of the beams of light belonging to the lateral portions of picture is more or less reduced.

The diaphragm according to the invention may be arranged both in front and behind the color filter. However, it is, as a rule, preferable to use the diaphragms in an approximately telecentric path of rays and not in highly convergent light.

The diaphragms may be rectangular, but they may have any suitable form to avoid dominants. Also the distribution of the diaphragms I with respect to the objective is not subject to certain conditions, but may be irregular; for instance, the central part of the objective may be uncovered, since this part is very important for the production of the picture.

An arrangement for taking pictures on lenticulated films is shown in Fig. 2. L denotes the lenticulated film, F the color filter provided with the three bands blue, red and green which is placed in front of the objective O. It has three dominant diaphragms $I_1$, $I_2$, $I_3$ parallel to the optical axis cooperating with the central color band in order to avoid dominants in transversely lenticulated films that appear on the upper and lower part of the picture. In Fig. 3 is also shown a dominant diaphragm D which extends not only perpendicularly to the plane of the color filter, but also to the straight boundaries of the filter bands. This diaphragm D avoids dominants which may occur on the right and the left-hand side of the picture. The diaphragm D in the embodiment shown cooperates both with the central band and with the lateral bands and has a trapezoidal shape. The lateral bands are, therefore, less influenced than the central band.

Further Fig. 3 shows a dominant diaphragm E of the known type which eliminates the remaining dominants of the lateral bands caused by a vignetting of the objective.

The diaphragm arrangement according to the invention is also applicable to multi-band filters which have more than three color bands. In Figs. 4a and 4b is shown a dominant diaphragm which is employed in front of a five-band filter with color repitition. The central red filter band cooperates with two dominant diaphragms I, whereas the lateral filter bands are influenced by the diaphragms I' which are at the same time designed as opaque bands between the color bands green and blue. The dominant diaphragms I' are not arranged in this case in front of the effective filter surface, but between two adjacent bands.

We claim as our invention:

1. An apparatus for taking pictures comprising a lenticulated film, a plural-zoned color filter in front of said film and through which light passes to the film, a diaphragm having one edge disposed closely adjacent a central zone of said filter, said diaphragm extending substantially at right angles to the filter and having substantially all parts thereof within the path of light passing through said central zone.

2. An apparatus for taking pictures comprising a lenticulated film, a plural-zoned color filter in front of said film and through which light passes to the film, a diaphragm having one edge disposed closely adjacent a central zone of said filter and substantially parallel to the lines dividing said zones, said diaphragm extending substantially at right angles to the filter and having substantially all parts thereof within the path of light passing through said central zone.

3. An apparatus for neutralizing the unequal shading of color separation images by the lens mount when taking color pictures on lenticulated film through plural-zoned filters, said apparatus comprising a diaphragm in the form of one or more thin vanes closely adjacent the filter and extending substantially at right angles to the filter and parallel to the length of the zones of the filter, each vane having substantially all parts thereof within the path of light passing through one of said zones and being constructed and arranged so as to partially cut off those impinging light rays not shaded by said lens mount to produce an evenly illuminated color separation image or images over the whole picture area.

KURT RÄNTSCH.
HEINZ RETZLAFF.